(12) United States Patent
Wong et al.

(10) Patent No.: US 12,150,531 B2
(45) Date of Patent: Nov. 26, 2024

(54) QUICK RELEASE SUPPORT SYSTEM FOR A PORTABLE DEVICE

(71) Applicant: AVIONICS SUPPORT GROUP, INC., Miami, FL (US)

(72) Inventors: Armand Andre Deixter Wong, Miami, FL (US); Alejandro Javier Rodrigo, Miami, FL (US); Hugo Lazaro Fortes, Miami, FL (US)

(73) Assignee: Avionics Support Group, Inc., Miami, FL (US)

( * ) Notice: Subject to any disclaimer, the term of this patent is extended or adjusted under 35 U.S.C. 154(b) by 24 days.

(21) Appl. No.: 17/850,708

(22) Filed: Jun. 27, 2022

(65) Prior Publication Data

US 2022/0408892 A1    Dec. 29, 2022

Related U.S. Application Data

(60) Provisional application No. 63/215,173, filed on Jun. 25, 2021.

(51) Int. Cl.
*A45C 11/00* (2006.01)
*F16M 13/00* (2006.01)

(52) U.S. Cl.
CPC .......... *A45C 11/00* (2013.01); *F16M 13/005* (2013.01); *A45C 2011/002* (2013.01); *A45C 2011/003* (2013.01); *A45C 2200/15* (2013.01)

(58) Field of Classification Search
CPC .............. A45C 11/00; A45C 2011/002; A45C 2011/003; A45C 2000/15; A45C 2200/15; F16M 13/005; F16M 13/00
See application file for complete search history.

(56) References Cited

U.S. PATENT DOCUMENTS 4,957,264 A  *  9/1990  Hakanen ................. B60R 11/02
                                                         248/510
5,193,890 A  *  3/1993  Robertson, Jr. ........ A47B 81/06
                                                         312/7.1

(Continued)

FOREIGN PATENT DOCUMENTS

CN        103062580 A  *  4/2013    ........... F16M 11/041

*Primary Examiner* — Tan Le
(74) *Attorney, Agent, or Firm* — FisherBroyles, LLP; Anthony J DoVale; Thomas J. Osborne, Jr.

(57) ABSTRACT

A quick release support system for a case for a portable device is provided. In one embodiment, for example, the quick release system comprises a case and a bracket. The case comprises a ramp, a ramp engagement surface disposed at a proximal edge of the ramp, at least one tab guide displaced from the ramp engagement surface, and a latch lock port. The at least one tab guide and the latch lock port is defined by the case. The bracket comprises a ramp tab extending from the bracket in a first direction the ramp tab adapted to engage the ramp engagement surface of the case. The bracket also comprises at least one tab and a latch lock. The at least one tab extends from the bracket in the first direction, and the at least one tab is adapted to extend into the at least one tab guide. A latch lock of the bracket comprises a latch lock engagement surface and a latch surface. The latch lock engagement surface is biased in a second direction. The latch surface is adapted to overcome the bias in a direction opposite the second direction to overcome the bias force and allow insertion of the latch lock engagement surface into the latch lock port and to be released by the bias force to engage the latch lock engagement surface with the latch lock port.

23 Claims, 14 Drawing Sheets

(56) References Cited

U.S. PATENT DOCUMENTS

| | | | | |
|---|---|---|---|---|
| 5,823,495 | A * | 10/1998 | Joss | B60R 11/0205 |
| | | | | 361/825 |
| 9,338,902 | B2 * | 5/2016 | Liu | G06F 1/1601 |
| 10,371,310 | B1 * | 8/2019 | Schulter | F16M 11/2078 |
| 10,876,325 | B2 * | 12/2020 | Cheung | F16M 11/16 |
| 2010/0176261 | A1 * | 7/2010 | Chen | F16M 13/02 |
| | | | | 248/231.91 |
| 2024/0035610 | A1 * | 2/2024 | Schulter | F16M 13/022 |

* cited by examiner

QUICK RELEASE SUPPORT SYSTEM FOR A PORTABLE DEVICE

CROSS-REFERENCE TO RELATED APPLICATIONS

This application claims the benefit of U.S. provisional application No. 63/215,173 entitled "Quick Release Support System for a Portable Device" and filed 25 Jun. 2021, which is hereby incorporated by reference as though fully set forth herein.

BACKGROUND a. Field

This disclosure relates to a quick release support system for a portable device, such as a tablet, other portable computing device, or a display.

b. Background

Detachable systems for electronic and other portable devices frequently allow users to support the portable devices in a fixed location or other mounting location. These detachable systems often are docking stations that include communication and powering connections for use with portable devices that are electronic and can be simply pulled by hand pressure from the docking station when needed. Other support systems have no communication or powering connections but are held to a supporting surface by suction, adhesives, or mechanical attachment. In some systems, the support is typically a "permanent" affixation and can provide stability for the device. In other systems, the support is temporary and often is lacking in rigidity, especially in harsh or unstable environments. In some temporary support systems, release structures are activated to release the portable device, but can be difficult to align and reengage upon return.

BRIEF SUMMARY

A quick release support system for a case for a portable device is provided. In one embodiment, for example, the quick release system comprises a case and a bracket. The case comprises a ramp, a ramp engagement surface disposed at a proximal edge of the ramp, at least one tab guide displaced from the ramp engagement surface, and a latch lock port. The at least one tab guide and the latch lock port is defined by the case. The bracket comprises a ramp tab extending from the bracket in a first direction the ramp tab adapted to engage the ramp engagement surface of the case. The bracket also comprises at least one tab and a latch lock. The at least one tab extends from the bracket in the first direction, and the at least one tab is adapted to extend into the at least one tab guide. A latch lock of the bracket comprises a latch lock engagement surface and a latch surface. The latch lock engagement surface is biased in a second direction. The latch surface is adapted to overcome the bias in a direction opposite the second direction to overcome the bias force and allow insertion of the latch lock engagement surface into the latch lock port and to be released by the bias force to engage the latch lock engagement surface with the latch lock port.

In another embodiment, a method of coupling a case of a portable device to a quick release support system is provided. In this embodiment, the quick release support system includes a case having a ramp and a ramp engagement surface disposed at a proximal edge of the ramp. At least one tab guide is displaced from the ramp engagement surface. The at least one tab and a latch lock port are defined by the case. A bracket includes a ramp tab extending from the bracket in a first direction the ramp tab adapted to engage the ramp engagement surface of the case. At least one tab extends from the bracket in the first direction. The at least one tab is adapted to extend into the at least one tab guide. A latch lock includes a latch lock engagement surface and a latch surface. The latch lock engagement surface is biased in a second direction. The latch surface is adapted to overcome the bias in a direction opposite the second direction to overcome the bias force and allow insertion of the latch lock engagement surface into the latch lock port and to be released by the bias force to engage the latch lock engagement surface with the latch lock port. The method includes aligning the ramp tab of the bracket with the ramp and moving the ramp tab along the ramp toward the ramp engagement surface. The ramp tab is engaged with the engagement surface. The case is pivoted relative to the bracket. The latch surface is engaged to overcome the bias of the latch lock. The at least one tab is inserted into the at least one tab guide, and the latch lock engagement surface is inserted into the latch lock port. The latch surface is disengaged to allow the bias force to engage the latch lock engagement surface with the latch lock port.

In yet another embodiment, a case is adapted to secure one of a plurality of different sized portable devices. In this embodiment, the case includes a protective shell adapted to support the portable device, and a plurality of different sized bezels. Each of the plurality of different sized bezels is adapted to secure a respective one of the plurality of different sized portable devices.

The foregoing and other aspects, features, details, utilities, and advantages of the present invention will be apparent from reading the following description and claims, and from reviewing the accompanying drawings.

DETAILED DESCRIPTION

Figure 1:
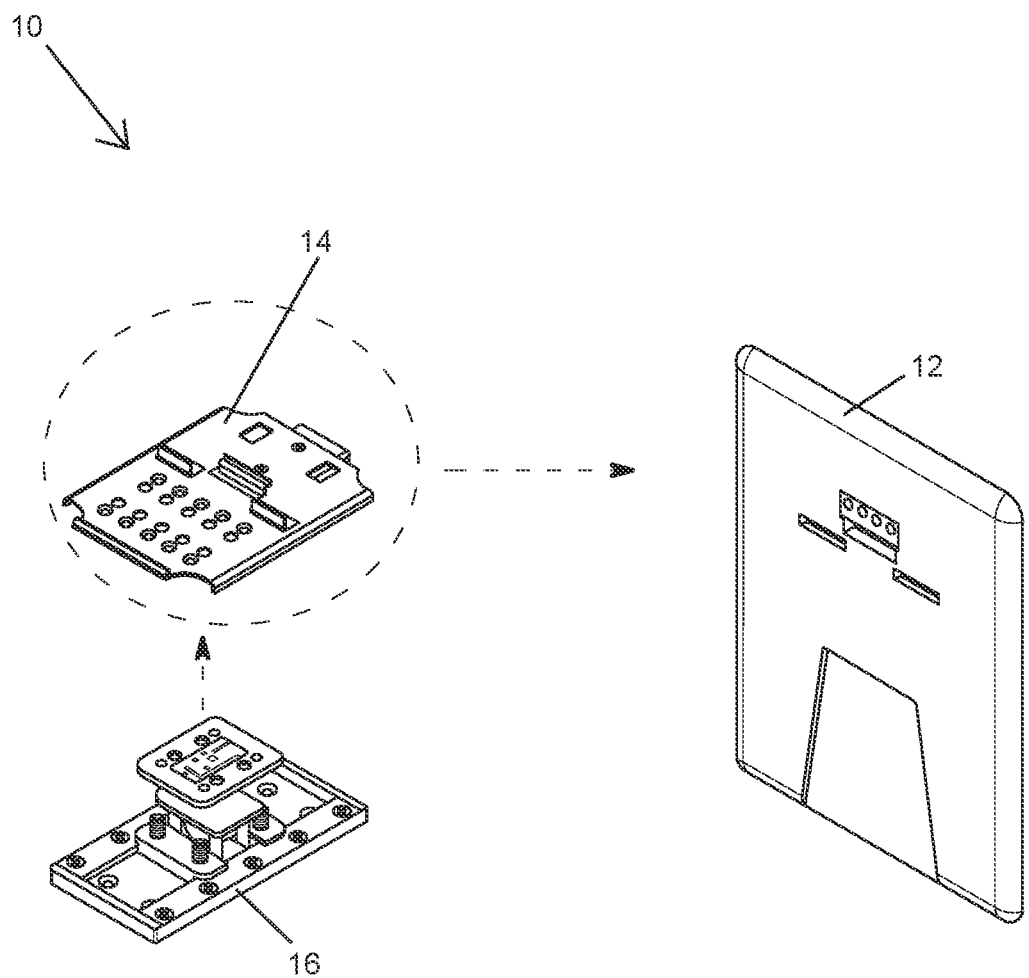
FIG. 1 shows an example embodiment of a quick release system adapted to releasably secure a portable device to a fixed location or other mounting location.

FIG. 1 shows an example embodiment of a quick release support system 10 adapted to releasably secure a portable device to a fixed location or other mounting location. The quick release system 10 comprises a case 12, a bracket 14 adapted to couple to the case 12, and a mount 16 adapted to secure the bracket 14 to the fixed location or mounting location.

Figures 2A, 2B:
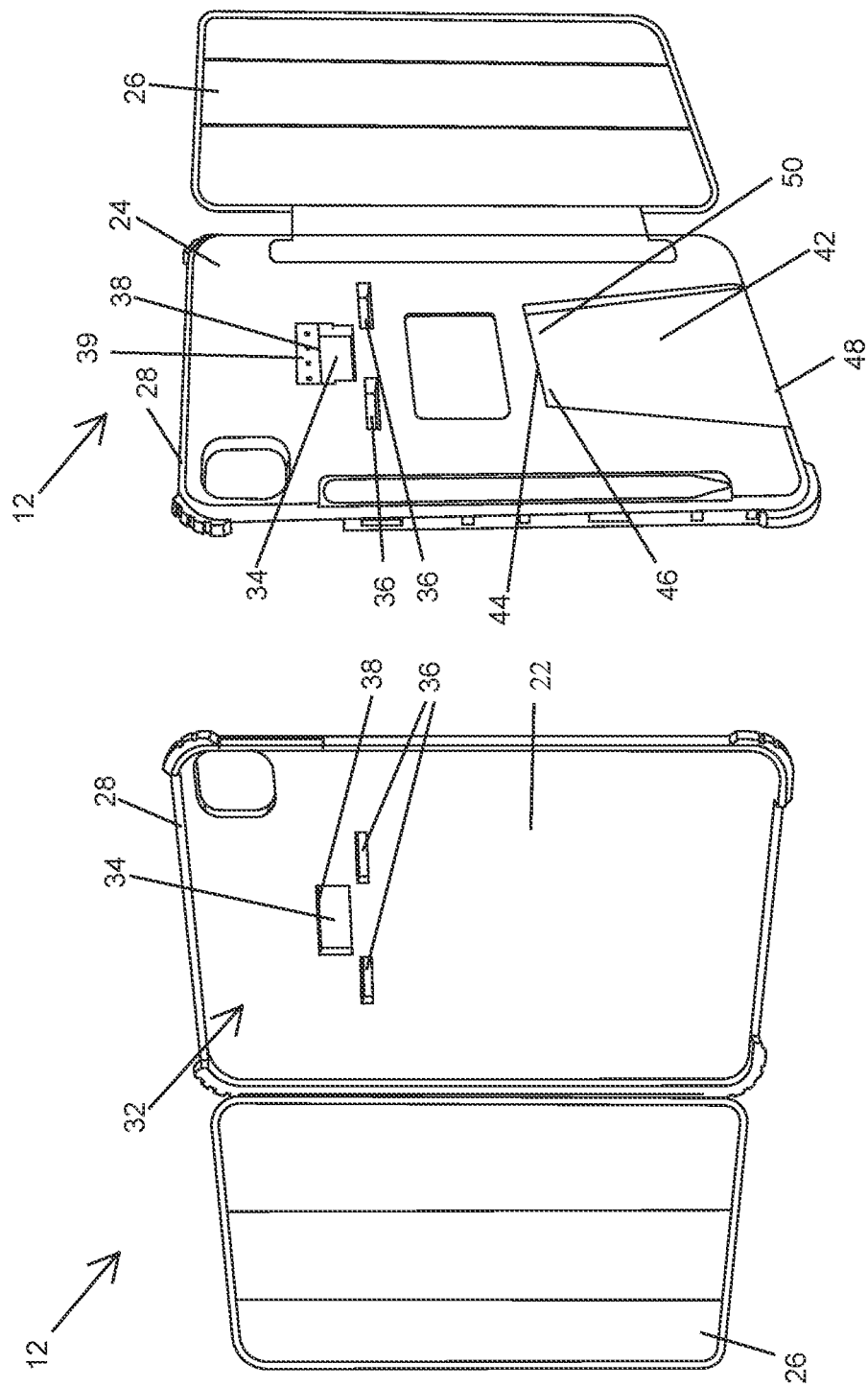
FIGS. 2A and 2B show a first front perspective view and a second rear perspective view, respectively, of an example embodiment of a case for a portable device.

FIGS. 2A and 2B show a first front perspective view and a second rear perspective view of an example embodiment of a case 12 for a portable device. The case 12 is adapted to couple the portable device to a fixed location or other mounting location via a quick release system 10 (shown in FIG. 1). Thus, the case 12 can be secured to and released from a fixed location or other mounting location via a bracket adapted to interact with the case 12.

FIG. 2A shows a view of a first, inner side 22 of the case, and FIG. 2B shows a view of a second, outer side 24 of the case. In this example, the case includes a cover 26 and a protective shell 28 adapted to attach to the portable device via one of a plurality of varying sized bezels 30 (shown in FIG. 3) adapted to secure corresponding various sized portable devices to the case 12. The connection of a portable device to the case 12 is merely one example. Although three bezels adapted for securing three different size portable devices to the case in the example shown in FIG. 3, any number of bezel(s) may be used. Other configurations are also contemplated. In one embodiment, for example, flexible tabs generally disposed at each corner of the inner side of the protective shell 28. The flexible tabs are adapted to snap over a plurality of corners of the portable device (e.g., a tablet) and secure the protective shell 28 to the corners of the portable device such that the protective shell extends around the sides and the back of the portable device. The flexible tabs may also extend in front of a front surface of the portable device and provide at least some protection to the front surface of the portable device in the event that the portable device falls onto a surface. However, any manner of connecting a portable device to the case 12 may be used.

The case 12 further includes a plurality of openings 32 adapted to mate with a mounting plate of a bracket to provide the quick release support system for securing the portable device to and releasing the portable device from a fixed location or other mounting location. In the embodiment shown in FIGS. 1 and 2A, for example, the case comprises a center latch lock port 34 and a pair of lateral tab guides 36. The center latch lock port 34 is adapted to receive a latch lock of a latch of the bracket 14 and provide a surface 38 to engage the latch lock for securing the case 12 to the bracket 14. In the particular embodiment shown in FIGS. 2A and 2B, for example, the surface 38 comprises a mounting surface 39 adapted to support a latch lock plate 40 secured adjacent to and/or within the center latch port 34 to provide the surface 38 to engage the latch lock of the bracket 14. In this embodiment, the latch lock plate 40 can be bolted, fused, riveted, or otherwise connected to the back surface of the case and be disposed directly adjacent the center latch port 34 or at least partially extend into the center latch port 34. In other embodiments, however, the surface 38 may be formed by an integral surface of the case that forms a back of the case 12.

The pair of lateral tab guides 36 further interact with a pair of lateral tabs that extend from the bracket into the respective pair of lateral tab guides 36. The combination of the latch lock interacting with the surface of the center latch port and the pair of tabs engaging a surface of the pair of lateral tab guides 36 secure (e.g., frictionally secure) the bracket 14 to the case 12. The latch lock of the bracket 14, as is described further herein, is biased (e.g., spring biased) to engage the surface 38 and, in turn, biases the pair of lateral to engage (e.g., frictionally engage) a surface of the pair of lateral tab guides 36. In this particular embodiment, the latch lock comprises a flanged surface that extends at least partially around the surface 38 (e.g., the latch lock plate 40) while the pair of lateral tabs are at least generally straight and provide a pair of surfaces adapted to frictionally engage respective surfaces of the pair of lateral tab guides 36. This is merely an example configuration, however. Instead, the latch lock may provide a generally flat surface and/or the pair of lateral tabs may each provide a flange that extends at least partially around a surface of a respective one of the pair of lateral tab guides 36. Further, although this particular embodiment shows a pair of lateral tabs and corresponding pair of lateral tab guides 36, the case may include one, two, or more tab guides and the bracket may have a corresponding number of tabs. Similarly, the latch of the bracket may include a plurality of latch locks.

The case 12 further comprises a ramp 42 and corresponding ramp engagement surface 44 disposed at a proximal edge 46 of the ramp 42. The surface 44 is adapted to engage a ramp tab of the bracket. In the particular embodiment shown in FIGS. 1 and 3, for example, the ramp 42 comprises a variable width opening starting relatively wider at a distal end 48 and relatively narrow at a proximal end 50 where the proximal edge 46 is disposed. Alternatively, the ramp 42 may comprise a generally rectangular dimension such that the ramp has a relatively consistent width dimension from the distal end to the proximal end. The variable width opening in the ramp as shown in FIG. 1, for example, enables the ramp 42 to progressively align the ramp tab of the bracket as it is moved within the ramp toward the ramp engagement surface 44 along a length of the ramp 42. As the ramp tab of the bracket slides along the ramp, a portion of the ramp can be sized to constrain the ramp tab in a sideways first direction and to guide the ramp tab into engagement with the ramp engagement surface 44.

To engage the bracket 14 with the case 12, the bracket 14 is angled and placed close to the case such that the ramp tab of the bracket 14 extends into the ramp and the latch lock, the pair of lateral tabs, and the latch surface are angled slightly away from the rear surface of the case. The ramp tab is slid within the ramp and into engagement with the ramp engagement surface 44. As the ramp tab engages the ramp engagement surface 44, the latch lock, the pair of lateral tabs, and the latch surface are pivoted towards the rear surface of the case such that the pair of lateral tabs extend into the lateral tab guides and as the latch surface is depressed or otherwise engaged to overcome a bias force (e.g., spring bias force) allowing the latch lock to extend into the latch lock port. As the latch surface is released, the bias force moves the latch lock into engagement with the surface 38 of the latch lock port.

To disengage the bracket 14 from the tab, the latch surface is pressed or otherwise engaged to overcome the bias force (e.g., spring bias force) of the latch to disengage the latch lock from the surface 38 of the latch lock plate 40 and allow the latch lock and the pair of lateral tabs to be removed from the latch lock port 34 and the pair of lateral tab guides 36, respectively, by pivoting the bracket away from the rear surface of the case 12. The bracket is slid down to disengage the ramp tab from the ramp engagement surface of the ramp and release the bracket from the case.

Figure 3:
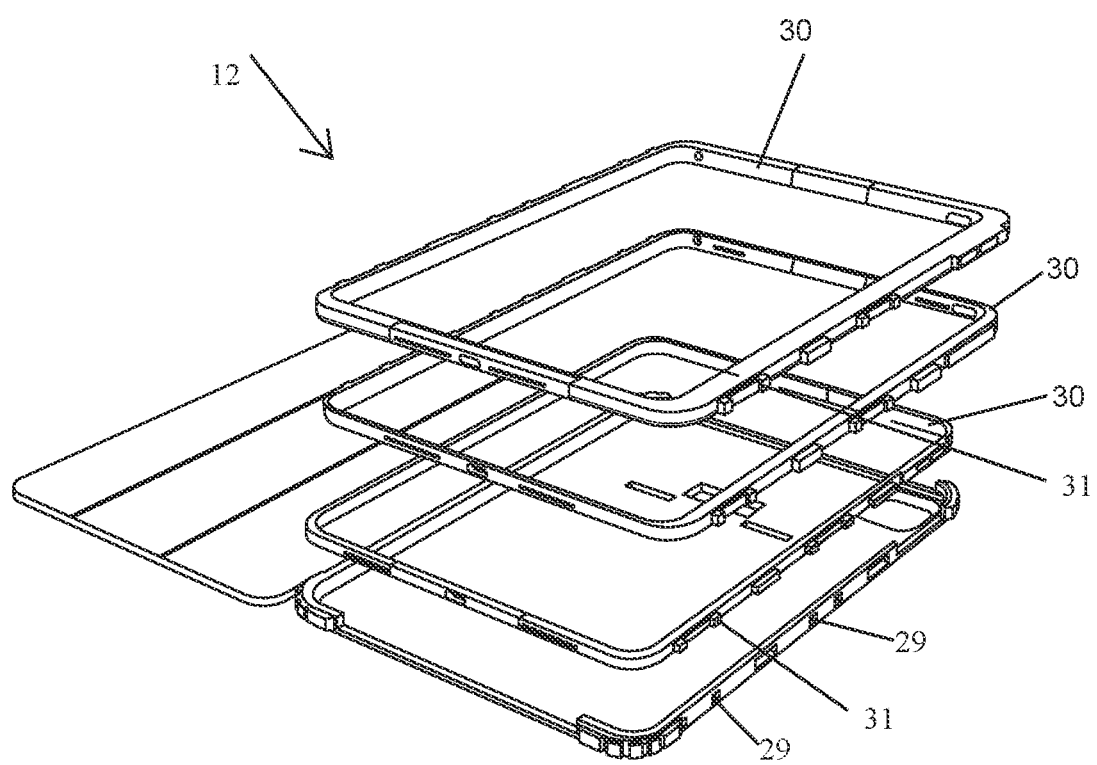
FIG. 3 shows a front plan view of the case for a portable device shown in FIGS. 2A and 2B with a plurality of varying size bezels configured to secure corresponding varying sized portable devices, such as tablets to the case.

FIG. 3 is a perspective view of the case 12 for a portable device shown in FIGS. 2A and 2B with a plurality of varying size bezels 30 configured to secure corresponding varying sized portable devices, such as tablets or smart phones, to the case. In this particular example, three bezels 30 are included for securing three varying sized portable devices to the case 12, however, any number of one or more bezel(s) may be included. The bezels 30 each extend around a perimeter of a portable device and snap or otherwise attach to an interior perimeter edge of the case 12. In the particular embodiment shown in FIG. 3, for example, each bezel 30 includes a plurality of tabs 31 extending from a perimeter of the bezel 30. These tabs engage with openings 29 formed in the case 12 to lock a portable device to within the respective bezel and the case. The various tabs, for example, may extend differing distances from a perimeter of the different sized bezels and/or a thickness of the different bezels may vary to adjust for the different sized portable devices to be locked within the case.

Figure 4:
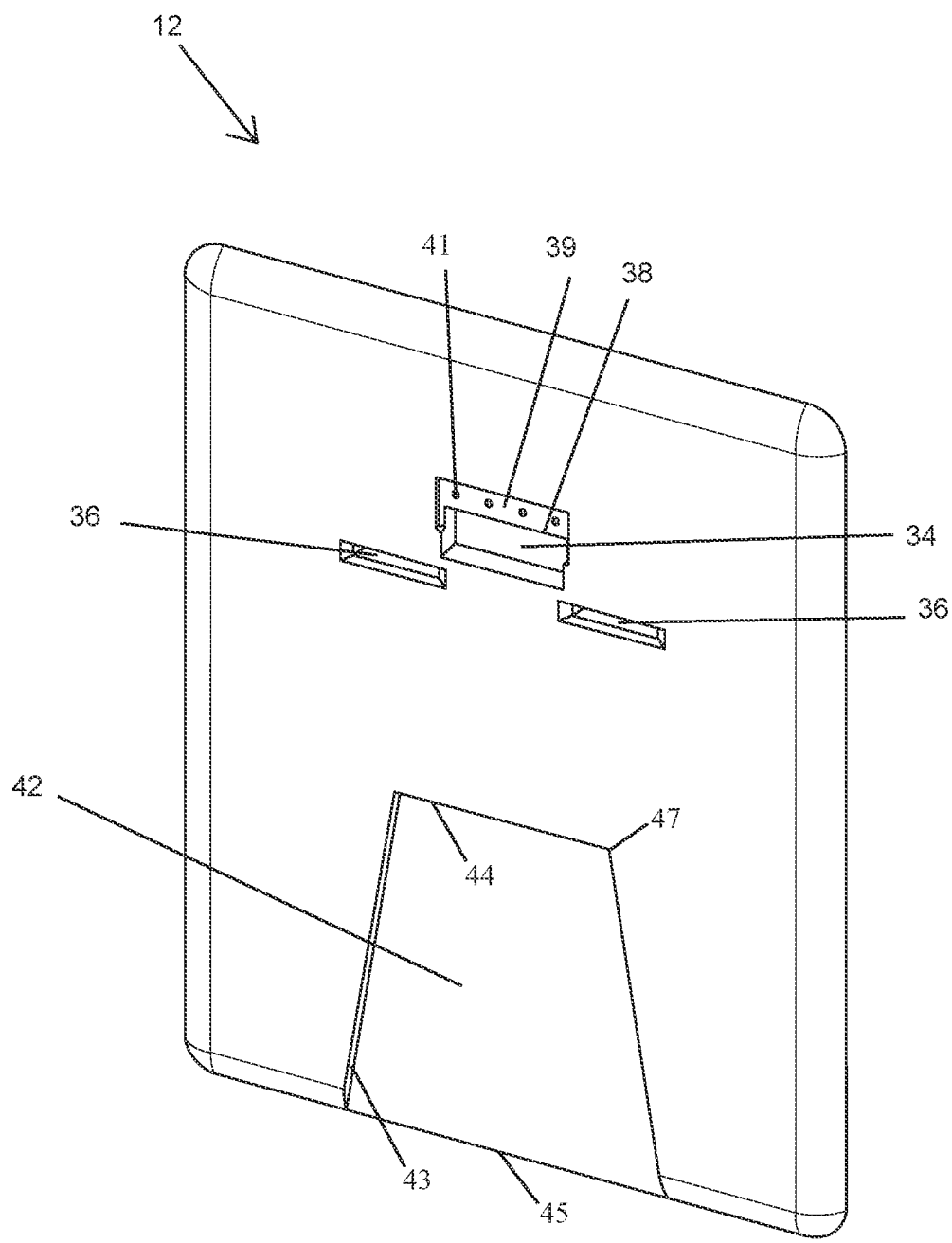
FIG. 4 shows a rear perspective view of an example embodiment of the case.

FIG. 4 shows a rear perspective view of an example embodiment of the case 12. FIG. 4 shows the pair of lateral tab guides 36, the latch lock port 34, and the ramp 42. The pair of lateral tab guides 36 and the latch lock port 34 comprise openings extending through and defined by the rear surface of the case 12. The pair of lateral tab guides 36 each comprise an engagement surface 37 for frictionally engaging the pair of lateral tabs of the bracket when the latch lock is biased by the latch into engagement with an engagement surface 38 of the latch lock port 34 (e.g., such as provided by a latch lock plate described below). The latch lock port 34 comprises a plurality of openings 41 adapted for connection to a latch lock plate to provide a reinforced engagement surface 38. The ramp 42 comprises a pair of side edges 43 having a variable width opening in the ramp 42 narrowing progressively from a distal end 45 toward a proximal end 47 and enables the ramp 42 to progressively align the ramp tab of the bracket as it is moved within the ramp toward the ramp engagement surface 44 along a length of the ramp 42.

Figure 5:
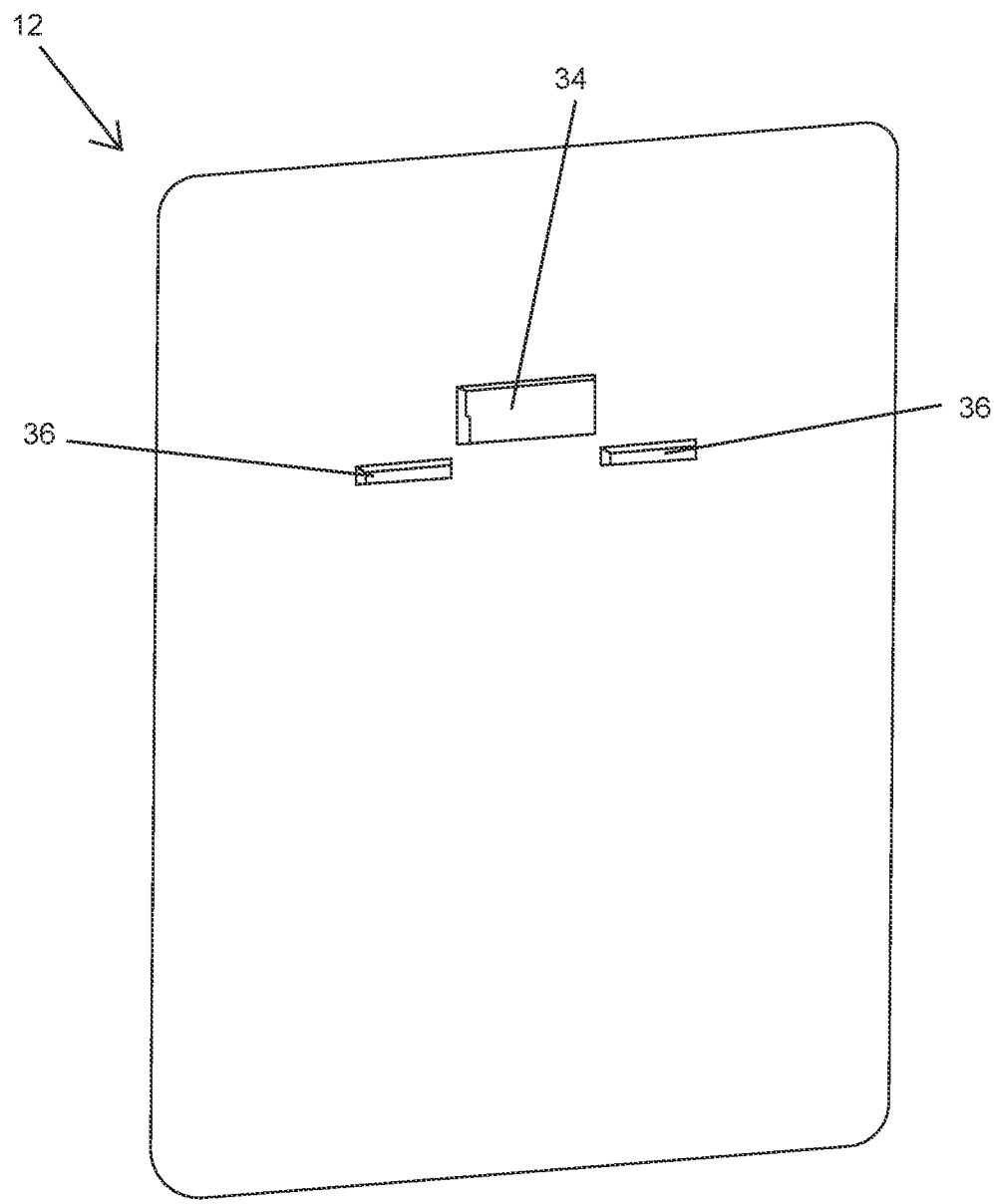
FIG. 5 shows a front perspective view of an example embodiment of the case.

FIG. 5 shows a front perspective view of an example embodiment of the case 12. FIG. 5 shows the pair of lateral tab guides 36 and the latch lock port 34 with a latch lock plate 40 (shown in FIGS. 6 and 7). As shown in FIG. 5, the pair of lateral tab guides 36 comprise openings defined by the wall of the case and provide engagement surfaces for frictional engagement of the lateral tabs of the bracket when the latch lock is biased by the latch into engagement with the engagement surface 38 provided by the latch lock plate 40.

Figure 6:
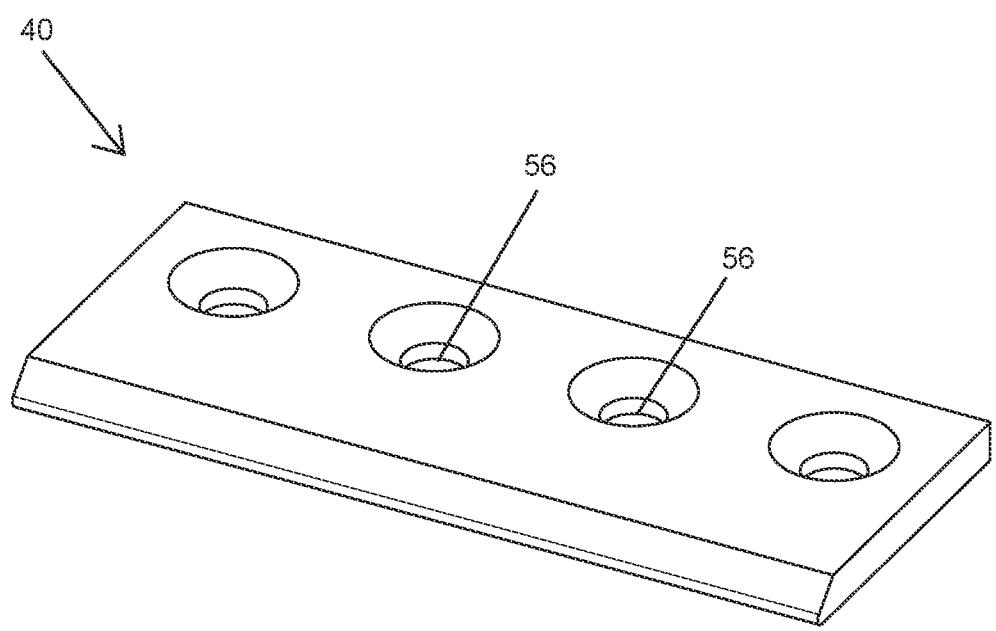
FIG. 6 shows a perspective view of an example embodiment of a latch lock plate adapted to attach to a wall of the case and form an engagement surface of the latch lock port to engage with the latch lock of the latch.

FIG. 6 shows a perspective view of an example embodiment of a latch lock plate 40 adapted to attach to a wall of the case 12 at a mounting surface 39 and form an engagement surface 38 of the latch lock port 34 to engage with the latch lock of the latch. In this particular embodiment, the latch lock plate 40 comprises a plurality of countersunk holes 56 that correspond to the plurality of openings 41 to permit attachment of the latch lock plate 40 to the mounting surface 39 of the wall of the case 12, such as via a plurality of screws or bolts. The latch lock plate 40 may, however, be connected to the case 12 via any number of connections, such as but not limited to rivets, adhesive, fusing, heat staking, or the like.

Figure 7:
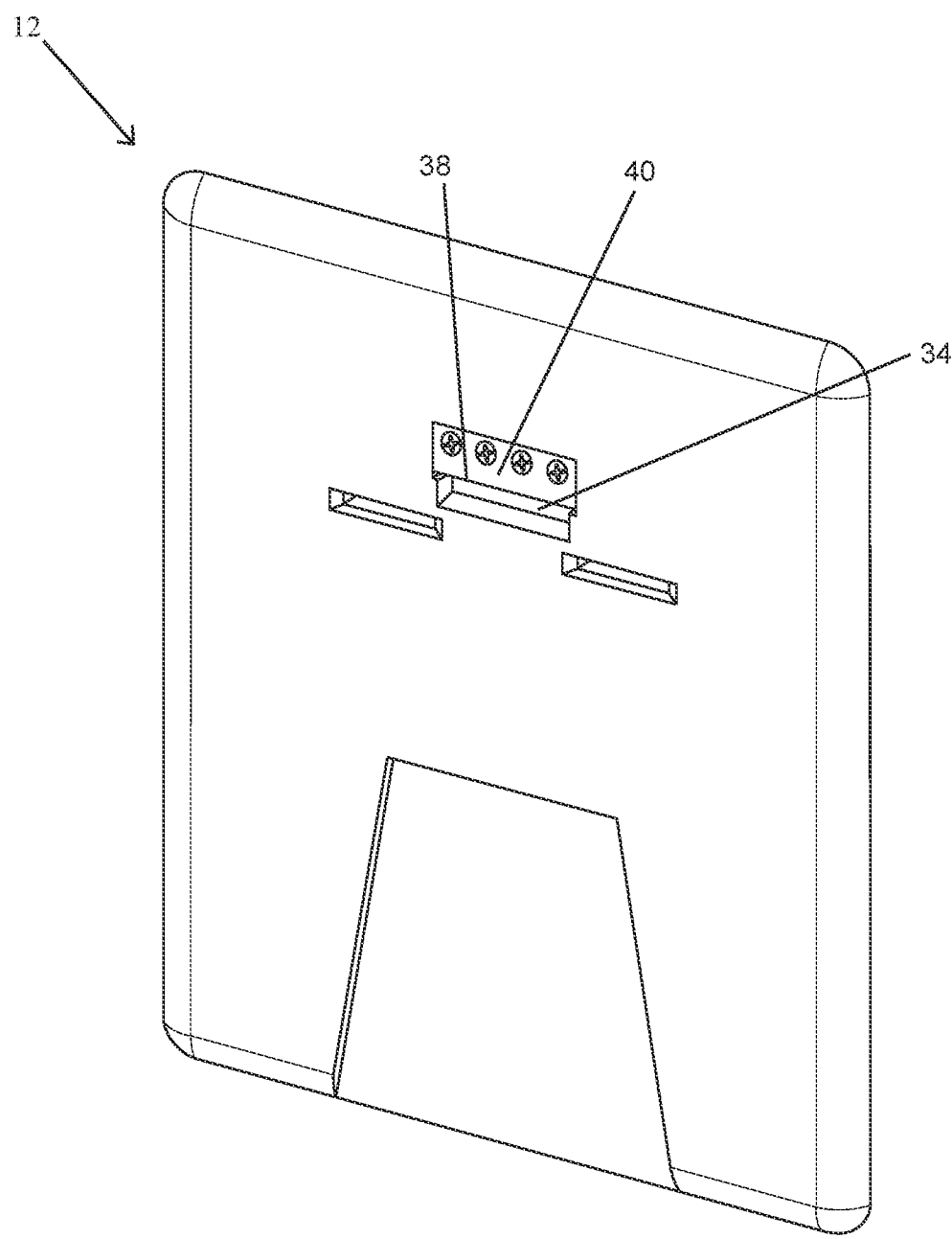
FIG. 7 shows a rear perspective view of an example embodiment of the case in which the latch lock plate is assembled with the case to provide a reinforced engagement surface for the latch lock port.

FIG. 7 shows a rear perspective view of the case 12 in which the latch lock plate 40 is assembled with the case 12 to provide a reinforced engagement surface 38 for the latch lock port 34. In this embodiment, a plurality of screws attach the latch lock plate 40 via the corresponding countersunk holes 56 of the latch lock plate 40 and the openings 41 in a surface disposed at the latch lock port 34.

Figure 8:
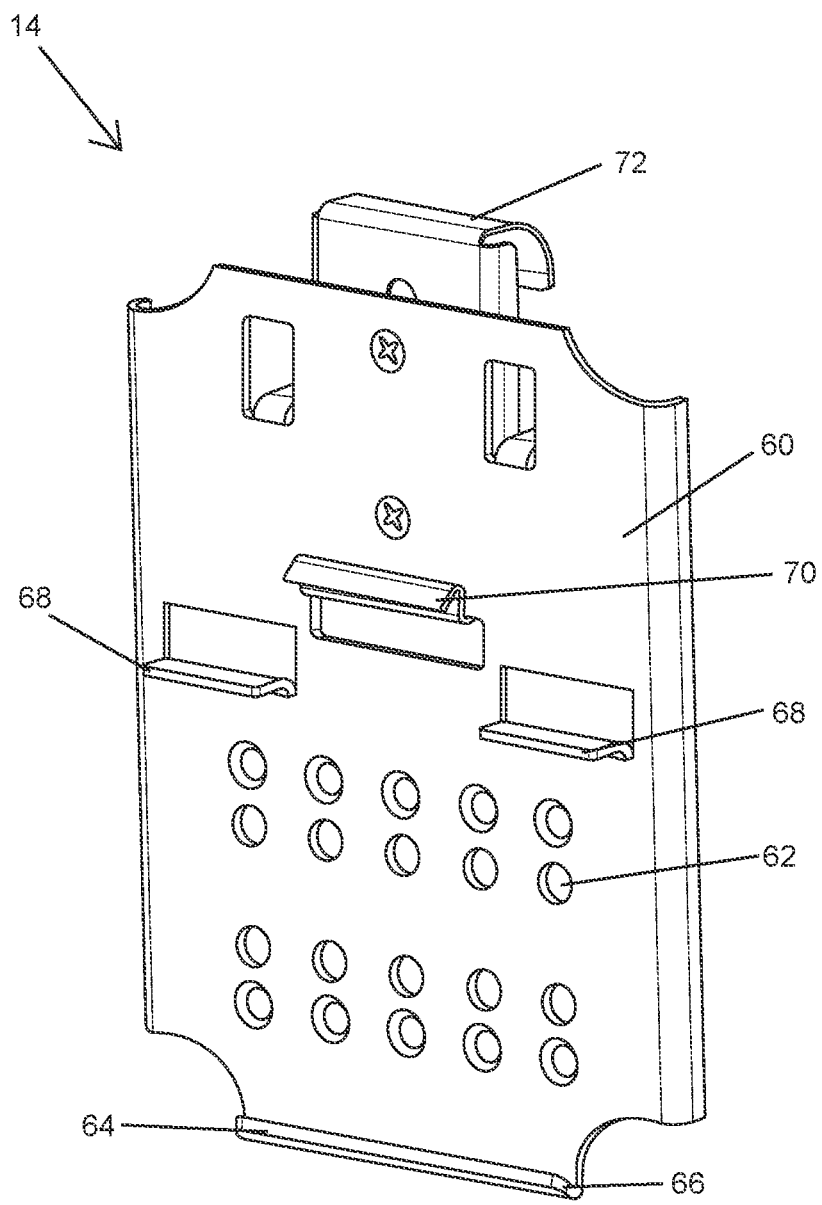
FIG. 8 shows a front perspective view of an example embodiment of a latch.

FIG. 8 shows a front perspective view of an example embodiment of a latch 14. In this embodiment, the latch 14 comprises a body 60. The body 60 defines a plurality of openings 62 adapted for coupling to a mount 16. The body 60 further defines a ramp tab 64 for engagement with a ramp engagement surface 44 of the ramp 42 of the case 12. In this embodiment, for example, the ramp tab 64 comprises a flange 66 extending away from the body 60 and adapted to engage the ramp engagement surface 44. The body 60 further defines a pair of lateral tabs 68 extending from the body 60 in the same direction as the ramp tab 64. Each of the pair of lateral tabs 66 are adapted to be inserted into and/or through the respective ones of the pair of lateral tab guides 36 of the case 12 and to engage with a surface of the respective lateral tab guide 66 when the latch lock 70 is biased against an engagement surface 38 (e.g., the latch lock plate 40) of the latch lock port 34. A latch lock 70 also extends away from the body 60 in the same direction as the ramp tab 64 and the pair of lateral tabs 68. The latch lock 70 is biased, such as by a spring bias, to engage the engagement surface 38 of the latch lock port 34. The latch lock 70 is moved by overcoming the bias force, such as by depressing the latch engagement surface 72 to enable the latch lock 70 to be extended into the latch lock port 34. By releasing the latch engagement surface 72, the bias force moves the latch lock 70 into engagement (e.g., frictional engagement) with the engagement surface 38 of the latch lock port 34.

Figure 9:
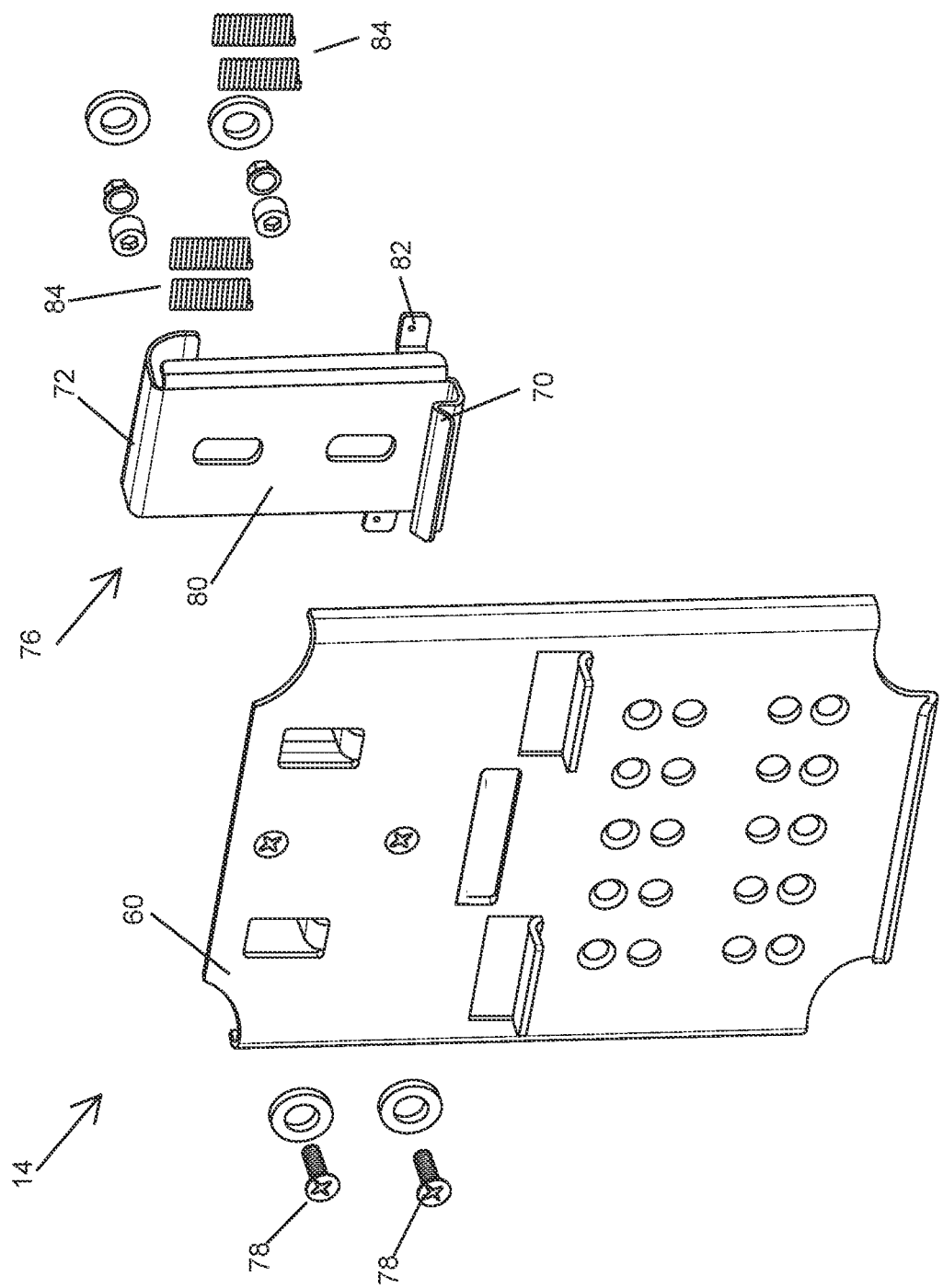
FIG. 9 shows an exploded view of an example embodiment of a latch.

FIG. 9 shows an exploded view of an example embodiment of a latch 14. In this embodiment, the latch comprises a body 60. The latch body 60 is attached to a latch assembly 76 via a pair of bolts 78. The latch assembly 76 comprises a latch slide 80 moveably engaged within a latch housing 82 that is attached to the body 60 via the pair of bolts 78. The latch slide 80 comprises the latch engagement surface 72 at a first end and the latch lock 70 at a second end. Two pair of springs 84 are coupled between the latch slide 80 and the latch housing 82 to provide a bias force to the latch lock 70 and bias it into engagement with the latch lock port engagement surface 38 of the case 12 in use.

Figure 10:
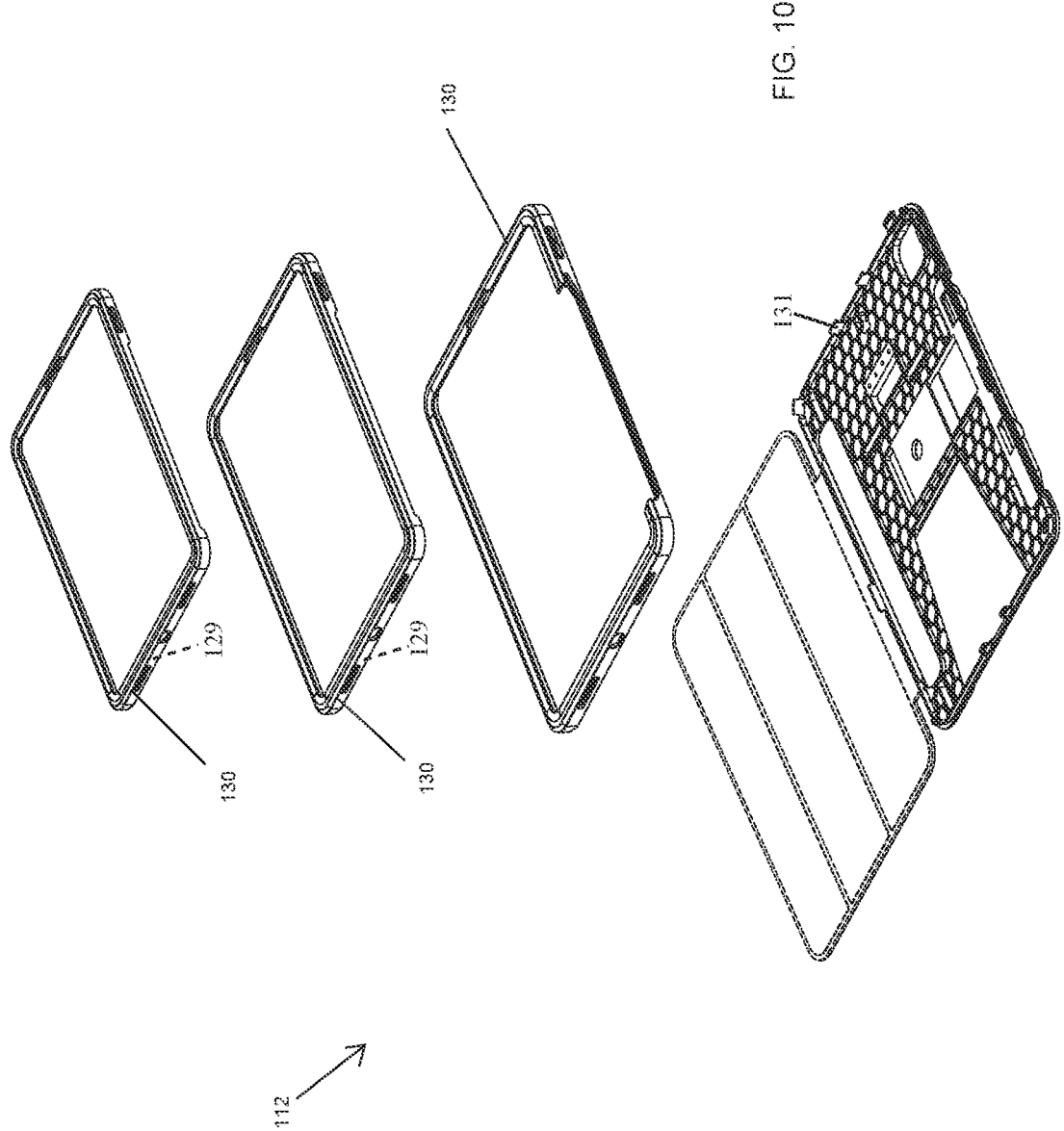
FIG. 10 is a perspective view of another embodiment of a case 112 including a plurality of varying size bezels configured to secure corresponding varying sized portable devices, such as tablets to the case.

FIG. 10 is a perspective view of another embodiment of a case 112 including a plurality of varying size bezels 130 configured to secure corresponding varying sized portable devices, such as tablets to the case 112. In this particular example, three bezels 130 are included for securing three varying sized portable devices to the case 112, however, any number of one or more bezel(s) may be included. The bezels extend around a perimeter of a portable device and snap or otherwise attach to an interior perimeter edge of the case 12. In the particular embodiment shown in FIG. 10, for example, the case 112 includes a plurality of tabs 131 that extend upwardly and that are adapted to engage one of the plurality of bezels 130 by engaging with a corresponding plurality of openings 129 in the respective bezels 130. These tabs 131 engage with openings 129 formed in the bezels 130 to lock a portable device to within the respective bezel 130 and the case 112. The different sized bezels 130 may include different interior dimensions and/or thicknesses to adjust for the different sized portable devices to be locked within the case.

Figure 11:
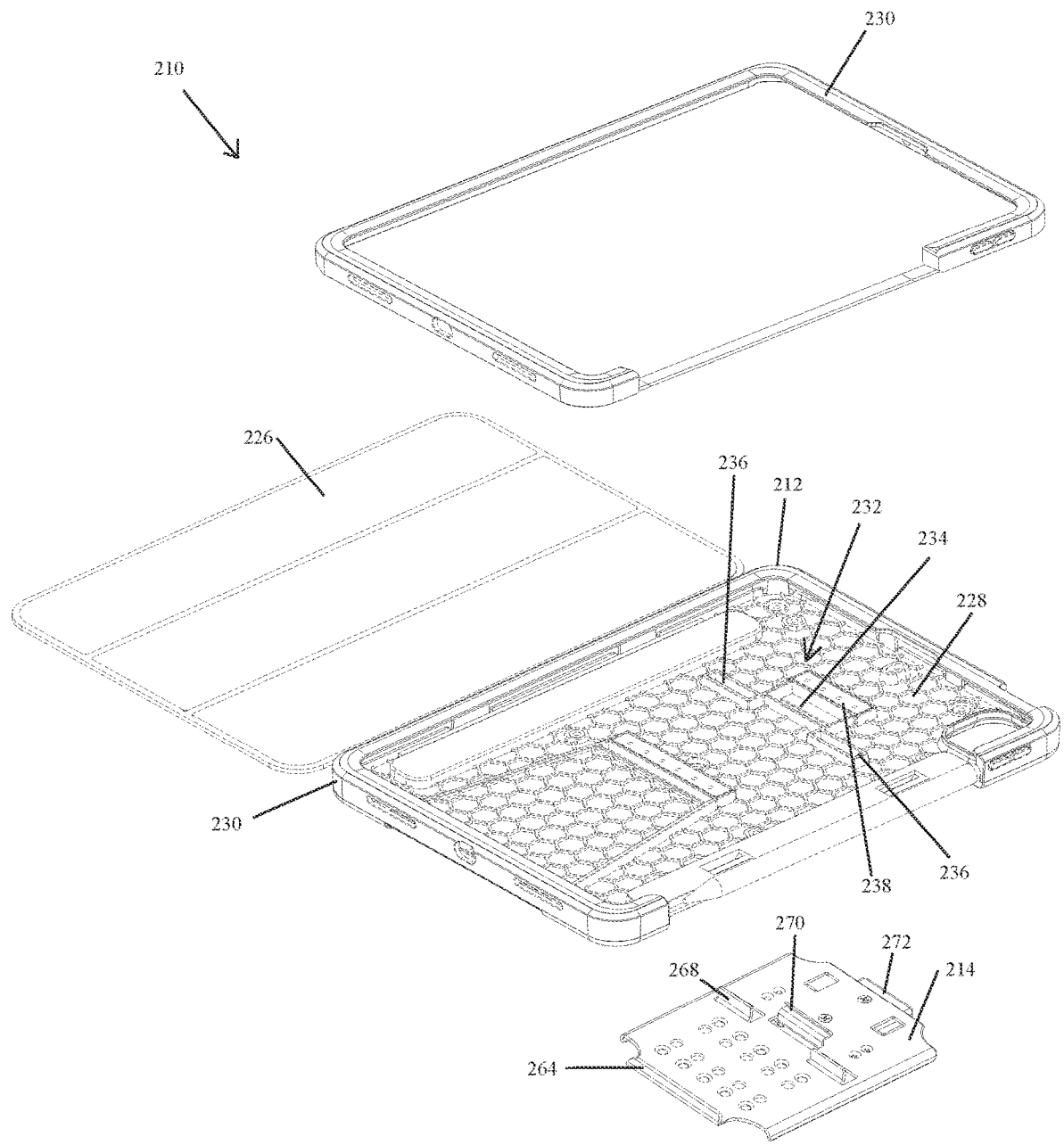
FIG. 11 shows a perspective view of an embodiment of a quick release system for a portable device comprising a case and a bracket.

FIG. 11 shows a perspective view of an embodiment of a quick release system 210 for a portable device comprising a case 212 and a bracket 214. In this embodiment, the case 212 comprises at least one bezel 230 adapted to secure the portable device within the case 212. In FIG. 11, for example, two size adapting bezels 230 are shown— one attached to a shell 228, and a second one shown separate from the shell 228. In this embodiment, the case comprises a first, inner side 222 of the case. The case includes a cover 226 and a protective shell 228 adapted to attach to the portable device via one of the plurality of bezels 230 adapted to secure corresponding one or more sized portable devices to the case 212. The connection of a portable device to the case 212 via one of a plurality of bezels 130 shown is merely one example. Other configurations are also contemplated. In one embodiment, for example, flexible tabs are generally disposed at each corner of the inner side of the protective shell 228. The flexible tabs are adapted to snap over a plurality of corners of the portable device (e.g., a tablet) and secure the protective shell 228 to the corners of the portable device such that the protective shell extends around the sides and the back of the portable device. The flexible tabs may also extend in front of a front surface of the portable device and provide at least some protection to the front surface of the portable device in the event that the portable device falls onto a surface. However, any manner of connecting a portable device to the case 212 may be used.

The case 212 further includes a plurality of openings 232 adapted to mate with a mounting plate of a bracket to provide the quick release support system for securing the portable device to and releasing the portable device from a fixed location or other mounting location. In this embodiment, for example, the case comprises a center latch lock port 234 and a pair of lateral tab guides 236. The center latch lock port 234 is adapted to receive a latch lock of a latch of the bracket 214 and provide a surface 238 to engage the latch lock for securing the case 212 to the bracket 214. Such as described above, the surface 238 may comprise a mounting surface adapted to support a latch lock plate 240 secured adjacent to and/or within the center latch port 234 to provide the surface 238 to engage the latch lock of the bracket 214. In this embodiment, the latch lock plate 240 can be bolted, fused, riveted, or otherwise connected to the back surface of the case and be disposed directly adjacent the center latch port 234 or at least partially extend into the center latch port 234. In other embodiments, however, the surface 238 may be formed by an integral surface of the case that forms a back of the case 212.

The pair of lateral tab guides 236 further interact with a pair of lateral tabs 268 that extend from the bracket 214 into the respective pair of lateral tab guides 236. The combination of the latch lock 270 interacting with the surface of the center latch port 234 and the pair of tabs 268 engaging a surface of the pair of lateral tab guides 236 secure (e.g., frictionally secure) the bracket 214 to the case 212. The latch lock of the bracket 214, as is described further herein, is biased (e.g., spring biased) to engage the surface 238 and, in turn, biases the pair of lateral tabs 268 to engage (e.g., frictionally engage) a surface of the pair of lateral tab guides 236. In this particular embodiment, the latch lock comprises a flanged surface that extends at least partially around the surface 238 (e.g., a latch lock plate) while the pair of lateral tabs 268 are at least generally straight and provide a pair of surfaces adapted to frictionally engage respective surfaces of the pair of lateral tab guides 236. This is merely an example configuration, however. Instead, the latch lock may provide a generally flat surface and/or the pair of lateral tabs may each provide a flange that extends at least partially around a surface of a respective one of the pair of lateral tab guides 236. Further, although this embodiment shows a pair of lateral tabs and corresponding pair of lateral tab guides 236, the case may include one, two, or more tab guides and the bracket may have a corresponding number of tabs. Similarly, the latch of the bracket may include a plurality of latch locks.

Figure 12:
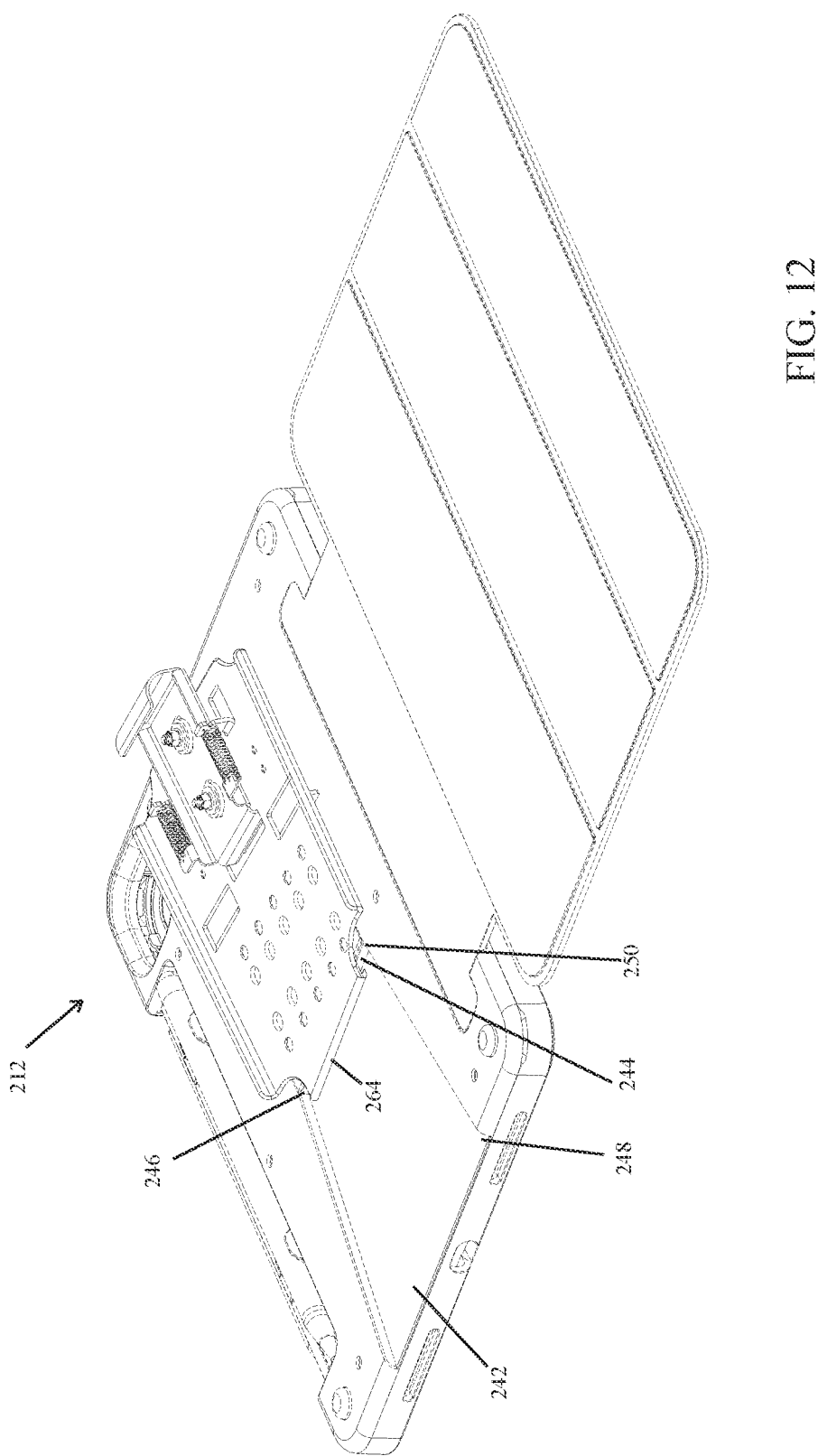
FIG. 12 shows a rear perspective view of the case with the bracket engaged to the case.
Figure 13:
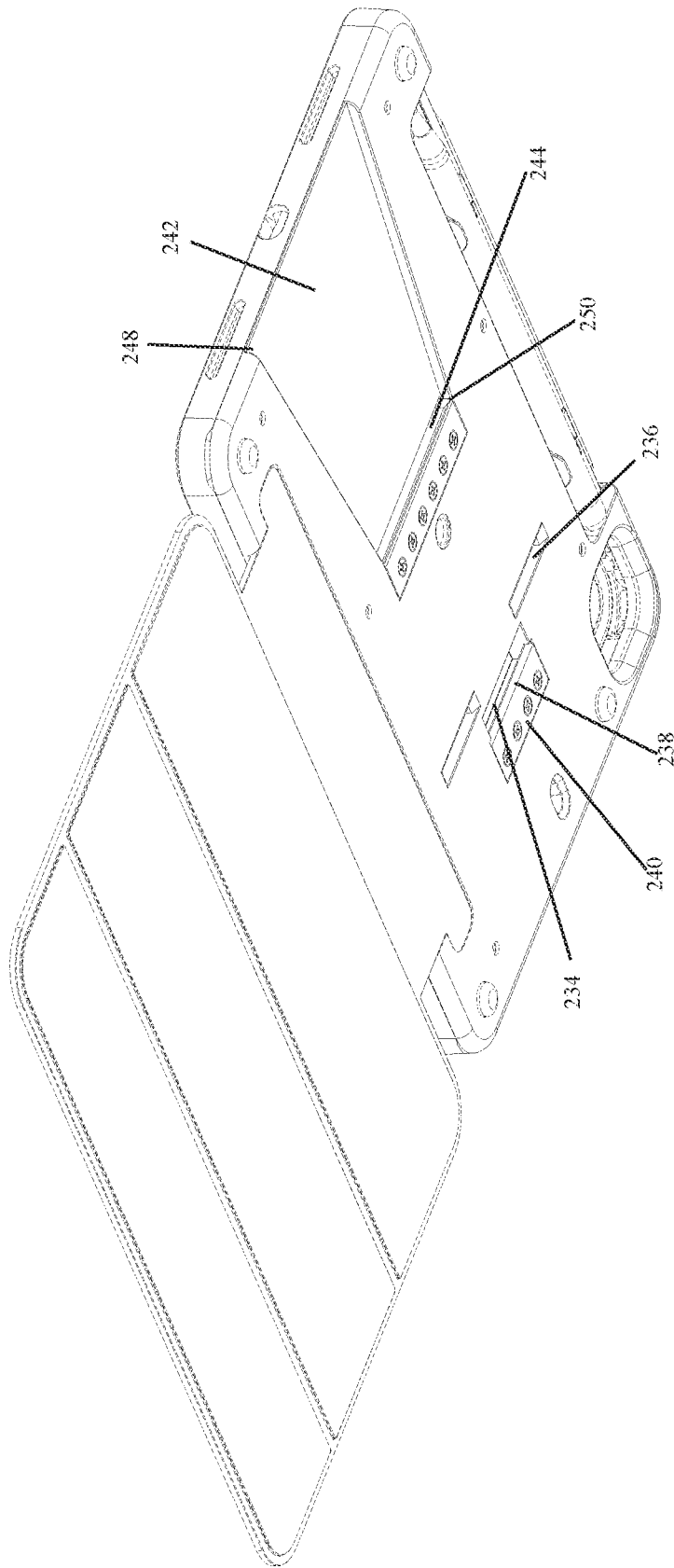
FIG. 13 shows a rear perspective view of the case shown in FIG. 12 without the bracket attached.

FIG. 12 shows a rear perspective view of the case 212 with the bracket 214 engaged to the case. FIG. 13 shows a rear perspective view of the case 212 shown in FIG. 12 without the bracket 214 attached. A ramp 242 includes a ramp engagement surface 244 disposed at a proximal edge 246 of the ramp 242. The ramp engagement surface 244 is adapted to engage a ramp tab 264 of the bracket. In this embodiment, the ramp 242 comprises a variable width opening starting relatively wider at a distal end 248 and relatively narrow at a proximal end 250 where the proximal edge 246 is disposed. Alternatively, the ramp 242 may comprise a generally rectangular dimension such that the ramp has a relatively consistent width dimension from the distal end to the proximal end. The variable width opening in the ramp as shown in FIG. 12, for example, enables the ramp 242 to progressively align the ramp tab of the bracket as it is moved within the ramp toward the ramp engagement surface 244 along a length of the ramp 242. As the ramp tab 264 of the bracket 214 slides along the ramp, a portion of the ramp 242 can be sized to constrain the ramp tab in a sideways first direction and to guide the ramp tab into engagement with the ramp engagement surface 244.

To engage the bracket 214 with the case 212, the bracket 214 is angled and placed close to the case such that the ramp tab 264 of the bracket 214 extends into the ramp 242 and the latch lock 270, the pair of lateral tabs 268, and the latch surface 272 are angled slightly away from the rear surface of the case. The ramp tab 264 is slid within the ramp 242 and into engagement with the ramp engagement surface 244. As the ramp tab 264 engages the ramp engagement surface 244, the latch lock 270, the pair of lateral tabs 268, and the latch surface are pivoted towards the rear surface of the case such that the pair of lateral tabs 268 extend into the lateral tab guides 236 and as the latch surface 272 is depressed or otherwise engaged to overcome a bias force (e.g., spring bias force) allowing the latch lock 270 to extend into the latch lock port 234. As the latch surface 272 is released, the bias force moves the latch lock 270 into engagement with the surface 238 of the latch lock port.

To disengage the bracket 214 from the tab, the latch surface 272 is pressed or otherwise engaged to overcome the bias force (e.g., spring bias force) of the latch to disengage the latch lock 270 from the surface 238 of the latch lock plate 240 and allow the latch lock 270 and the pair of lateral tabs 268 to be removed from the latch lock port 234 and the pair of lateral tab guides 236, respectively, by pivoting the bracket away from the rear surface of the case 212. The bracket is slid down to disengage the ramp tab 264 from the ramp engagement surface 244 of the ramp and release the bracket 214 from the case 212.

Figure 14:
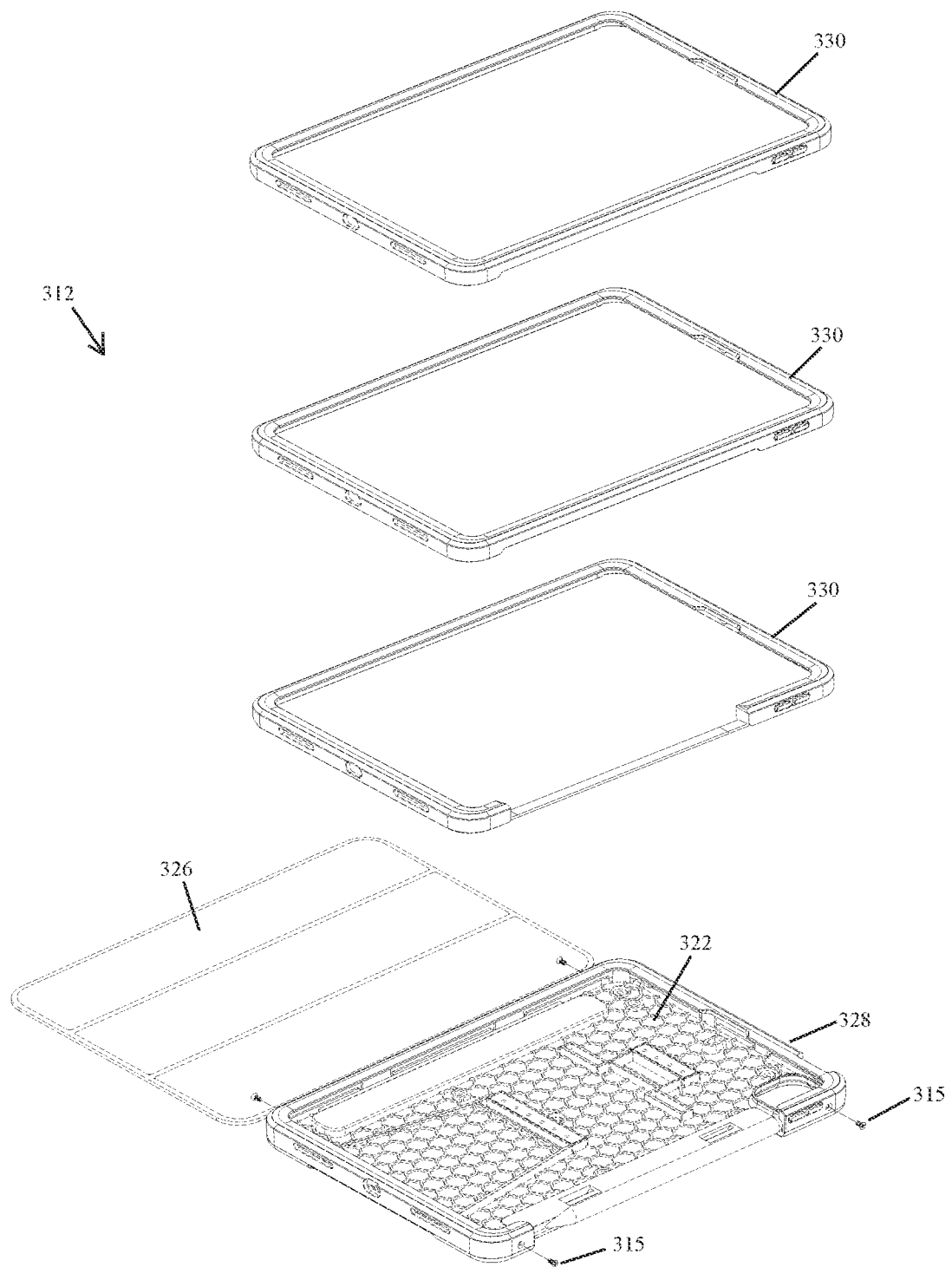
FIG. 14 is a top perspective view of another embodiment of a portable device case with a plurality of size adapting bezels.

FIG. 14 is a top perspective view of another embodiment of a portable device case 312 with a plurality of size adapting bezels 330. In this embodiment, the case 312 comprises at least one bezel 330 adapted to secure the portable device within the case 312. In FIG. 14, for example, four size adapting bezels 330 are shown— three above the case 312, and one attached to the case 312. In this embodiment, the case 312 comprises a first, inner side 322 of the case. The case 312 includes a cover 326 and a protective shell 328 adapted to attach to the portable device via one of the plurality of bezels 330 adapted to secure corresponding one or more sized portable devices to the case 312. The connection of a portable device to the case 312 via one of a plurality of bezels 330 shown is merely one example. Other configurations are also contemplated. In one embodiment, for example, flexible tabs are generally disposed at each corner of the inner side of the protective shell 328. The flexible tabs are adapted to snap over a plurality of corners of the portable device (e.g., a tablet) and secure the protective shell 228 to the corners of the portable device such that the protective shell extends around the sides and the back of the portable device. The flexible tabs may also extend in front of a front surface of the portable device and provide at least some protection to the front surface of the portable device in the event that the portable device falls onto a surface. However, any manner of connecting a portable device to the case 212 may be used.

In the embodiment shown in FIG. 14, the corresponding bezel 330 is attached to the shell 328 of the case 312 via one or more screws or bolts 315 to secure the bezel to the shell 328 of the case and, thus secure the portable device within the case 212. Screws or bolts 315 is an added security feature and may or may not be used.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A quick release support system for a case for a portable device comprising:
    a case comprising:
        a ramp,
        a ramp engagement surface disposed at a proximal edge of the ramp, and
        at least one tab guide displaced from the ramp engagement surface, the at least one tab guide defined by the case, and
        a latch lock port defined by the case; and
    a bracket comprising:
        a ramp tab extending from the bracket in a first direction the ramp tab adapted to engage the ramp engagement surface of the case;
        at least one tab extending from the bracket in the first direction, the at least one tab adapted to extend into the at least one tab guide, and
        a latch lock comprising a latch lock engagement surface and a latch surface, the latch lock engagement surface is biased in a second direction and the latch surface is adapted to overcome the bias in a direction opposite the second direction to overcome the bias force and allow insertion of the latch lock engagement surface into the latch lock port and to be released by the bias force to engage the latch lock engagement surface with the latch lock port.

2. The quick release support system of claim 1 comprising a mount adapted to secure the bracket to a location.

3. The quick release support system of claim 1 wherein the ramp comprises a variable width opening narrowing from a distal end toward a proximal end of the ramp.

4. The quick release support system of claim 3 wherein the variable width is adapted to progressively align the ramp tab of the bracket as it is moved within the ramp toward the ramp engagement surface along a length of the ramp.

5. The quick release support system of claim 1 wherein the ramp comprises a rectangular ramp comprising a relatively consistent width dimension from a distal end toward a proximal end of the ramp.

6. The quick release support system of claim 1 wherein a width dimension at a proximal end of the ramp is sized to constrain the ramp tab in a lateral first direction and to guide the ramp tab into engagement with the ramp engagement surface.

7. The quick release support system of claim 1 wherein the at least one tab of the bracket comprises a tab surface adapted to frictionally engage the at least one tab guide.

8. The quick release support system of claim 1 wherein the at least one tab guide comprises a pair of laterally spaced tab guides and the at least one tab comprises a pair of laterally spaced tabs corresponding to the pair of laterally spaced tab guides.

9. The quick release support system of claim 1 wherein the latch lock port comprises a port engagement surface adapted to be engaged by the latch lock engagement surface.

10. The quick release support system of claim 9 wherein the port engagement surface comprises a latch lock plate secured at least partially within the latch lock port.

11. The quick release support system of claim 1 wherein the bias of the latch lock is provided by at least one spring.

12. The quick release support system of claim 1 wherein the bias of the latch lock is adapted to be overcome by pressing the latch surface.

13. The quick release support system of claim 1 wherein the case comprises a plurality of different sized bezels adapted to secure different sized portable devices via a respective one of the plurality of different sized bezels.

14. A method of coupling a case of a portable device to a quick release support system, the quick release support system comprising:
    a case comprising:
        a ramp,
        a ramp engagement surface disposed at a proximal edge of the ramp, and
        at least one tab guide displaced from the ramp engagement surface, the at least one tab guide defined by the case, and
        a latch lock port defined by the case; and a bracket comprising:
- a ramp tab extending from the bracket in a first direction the ramp tab adapted to engage the ramp engagement surface of the case;
- at least one tab extending from the bracket in the first direction, the at least one tab adapted to extend into the at least one tab guide, and
- a latch lock comprising a latch lock engagement surface and a latch surface, the latch lock engagement surface is biased in a second direction and the latch surface is adapted to overcome the bias in a direction opposite the second direction to overcome the bias force and allow insertion of the latch lock engagement surface into the latch lock port and to be released by the bias force to engage the latch lock engagement surface with the latch lock port, the method comprising:
- aligning the ramp tab of the bracket with the ramp and moving the ramp tab along the ramp toward the ramp engagement surface;
- engaging the ramp tab with the engagement surface;
- pivoting the case relative to the bracket;
- engaging the latch surface to overcome the bias of the latch lock;
- inserting the at least one tab into the at least one tab guide and the latch lock engagement surface into the latch lock port;
- disengaging the latch surface to allow the bias force to engage the latch lock engagement surface with the latch lock port.

15. The method of claim 14 wherein the ramp comprises a variable width opening narrowing from a distal end toward a proximal end of the ramp.

16. The method of claim 14 wherein a width dimension at a proximal end of the ramp is sized to constrain the ramp tab in a lateral first direction and to guide the ramp tab into engagement with the ramp engagement surface.

17. The method of claim 14 wherein the at least one tab of the bracket comprises a tab surface adapted to frictionally engage the at least one tab guide.

18. The method of claim 14 wherein the at least one tab guide comprises a pair of laterally spaced tab guides and the at least one tab comprises a pair of laterally spaced tabs corresponding to the pair of laterally spaced tab guides.

19. The method of claim 14 wherein the latch lock port comprises a port engagement surface adapted to be engaged by the latch lock engagement surface.

20. The method of claim 19 wherein the port engagement surface comprises a latch lock plate secured at least partially within the latch lock port.

21. The method of claim 14 wherein the bias of the latch lock is provided by at least one spring.

22. The method of claim 14 wherein the bias of the latch lock is adapted to be overcome by pressing the latch surface.

23. The method of claim 14 wherein the case comprises a plurality of different sized bezels adapted to secure different sized portable devices via a respective one of the plurality of different sized bezels.

* * * * *